Patented Mar. 10, 1953

2,631,173

UNITED STATES PATENT OFFICE 2,631,173

PRODUCTION OF CYCLOOCTADIENE

John C. Hillyer and James V. Smith, Bartlesville, Okla., assignors to Phillips Petroleum Company, a corporation of Delaware No Drawing. Application January 4, 1949, Serial No. 69,248

7 Claims. (Cl. 260—666)

This invention relates to the treatment of conjugated aliphatic diolefins to form cyclooctadienes. In some of its preferred aspects the invention relates to the production of 1,5-cyclooctadiene by treatment of 1,3-butadiene at selected reaction conditions.

Heretofore, hydrocarbons having an 8-membered ring system and particularly those containing two double bonds, i. e., cyclooctadiene, have been produced only in small amounts by laborious or rather inefficient laboratory scale procedures. Because of the difficulties in their production, these products have remained in the classification of rare chemicals, and have received little attention from the viewpoint of practical use. However, as intermediates in the synthesis of other useful chemicals, their employment appears very attractive. Cyclooctadiene would be a potentially significant chemical were there a practical and economically advantageous method for its production.

An object of this invention is to produce cyclooctadienes.

Another object is to produce 1,5-cyclooctadiene.

A further object is to obtain practical yields of 1,5-cyclooctadiene by conversion of 1,3-butadiene.

A still further object is to provide a process wherein 1,3-butadiene is subjected to treatment at elevated temperatures under pressure to produce 1,5-cyclooctadiene.

A further object is to convert hydrocarbons of the 1,3-butadiene series to hydrocarbons of the 1,5-cyclooctadiene series by treatment of the former at selected reaction conditions causing a relatively low total conversion.

We have now found a new method for the production of 1,5-cyclooctadiene hydrocarbons from low cost and readily available raw materials. According to the process of our invention, 1,3-butadiene or a substituted 1,3-butadiene type as indicated is subjected to thermal treatment at elevated pressures under selected conditions whereby the butadiene is condensed to the 8-membered compound, 1,5-cyclooctadiene.

The reaction involved in our process is a surprising and unexpected discovery. The reaction of conjugated diolefins with unsaturated structures, particularly ethylenic double bonds, is well known in the art. It proceeds according to the so-called Diels-Alder reaction. According to this classical reaction a compound containing an ethylenic linkage, which is frequently referred to as the dienophylic component, combines with the conjugated diene system by a 1,4-addition reaction to form a 6-membered carbocyclic structure. For example, the conjugated diolefin piperylene reacts with maleic anhydride, which in this reaction serves as the dienophyl, according to the following equation:

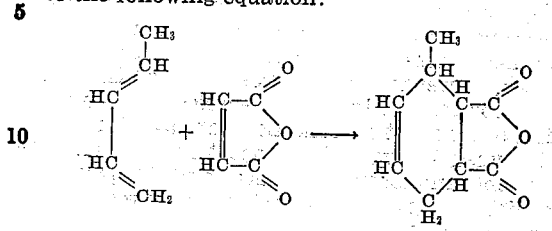

to form 1-methyl-1,2,3,4-tetrahydrophthalic anhydride. In a similar manner 1,3-butadiene under suitable reaction conditions reacts with itself according to the above mechanism to yield the well-known dimer, 4-vinyl-1-cyclohexene. In this reaction one molecule of butadiene undergoes 1,4-addition as a conjugated diolefin, whereas the other molecule serves as the dienophyl containing a simple ethylenic linkage. In accordance with well-established theories of structure the cyclization of hydrocarbons proceeds to the formation of 6-membered rings whenever possible, as the most stable structures. Occasionally, 5-membered ring structures are stable and will be formed. Examples of formation of 7 and 8-membered rings are rare. For example, n-heptane in the presence of suitable catalysts is cyclized but it does not form a 7-membered ring. On the contrary, it is aromatized to toluene, which contains a stable 6-membered ring. Similar reactions reported in the literature would lead to a generalized prediction that in the cyclization of hydrocarbons, 6-membered rings, particularly 6-membered benzene rings will be formed in preference to those containing a greater number of carbon atoms.

Thus, our discovery of a process whereby butadiene can be condensed with itself to produce the 8-membered ring compound, 1,5-cyclooctadiene is completely unexpected and lies outside the range of any prediction based on previous experience. The reaction is not in accord with the aforementioned Diels-Alder mechanism and at the same time it is at variance with the usually observed formation of 6-membered rings when straight chain compounds are cyclized. In the practice of our invention, butadiene is passed through a reactor, which may conveniently be a steel tube furnace, under superatmospheric pressure at considerably elevated temperatures at a rate of flow that provides sufficient residence time for the dimerization reaction but controlled to prevent the subsequent decomposition of the dimer into the lower boiling material and heavy polymers. Total liquid products then pass through a distillation system in which unreacted butadiene is first flashed off and recycled to the reactor. The residue is then subjected to a fractionation step in which a fraction boiling in the range of 290–310° F. is segregated. This fraction comprises principally 1,5-cyclooctadiene and on redistillation in a suitable fractionation system, the pure hydrocarbon boiling at 298–300° F. is readily isolated.

The temperature in the reactor is maintained between 600 and 1100° F. but preferably in the range between 650 and 900° F. Below this optimum temperature range dimerization of butadiene takes place to the 4-vinyl-1-cyclohexene almost exclusively. Only very minor quantities of 1,5-cyclooctadiene are formed. At higher temperatures decomposition of the dimeric products and the butadiene itself form light gases and various heavy polymers. Solids and the like are formed to a large extent and the reaction becomes very inefficient. Deposition of coke within the reactor will become a serious problem above the optimum temperature range. Within the range cited, however, a good proportion of the butadiene is reacted to form 1,5-cyclooctadiene when the other reaction conditions are also limited as discussed below. The proportion of 4-vinyl-1-cyclohexane formed is reduced and the quantities of light gases and heavy polymers are maintained at a minimum.

An effective means for temperature control in the reactor is desirable since the reaction proceeds exothermally and excessive temperatures may readily occur. As pointed out above these lead to deterioration of the product and to considerable operating difficulties with coke formation and the like. Various means of dissipating heat in exothermic vapor phase reactions are well-known in the art, and any suitable means for eliminating this heat and maintaining temperature control within a desired narrow range may be used.

The pressure within the reactor is maintained within the range of 20 to 250 pounds per square inch absolute, and preferably within the range of 35 to 120 p. s. i. a. When operating at atmospheric pressure, it is found that only small quantities of 1,5-cyclooctadiene are formed. As pressures are increased, increasing amounts of this hydrocarbon are formed from the dimerization. However, as pressure increases, reaction rates and exothermic heat liberation are likewise increased and operating problems become complex. It has been found that the range of 35 to 120 pounds absolute is an operating range at which practical yields of cyclooctadiene may be produced, while at the same time controlling the temperature and exothermic heat of reaction with reasonable facility.

The rate of flow of butadiene to the reactor is regulated to provide a residence time normally between 1 and 50 seconds. Preferably, however, we maintain the residence time of butadiene within the heated zone of the reactor between 2 and 20 seconds. At more rapid flow rates, conversions of course are reduced and the quantity of 1,5-cyclooctadiene produced is uneconomically small. Increasing conversion time, however, beyond the given limits results in secondary reactions leading to the decomposition of the 1,5-cyclooctadiene and other materials present becoming important and reduced yields again occur.

We have found a contact time of approximately 20 seconds, which at a pressure of 55 p. s. i. a. and 810° F. is equivalent to a space velocity of 260 standard gas vol./vol. of reactor space per hour to be a very convenient operating range.

While ranges for the reaction conditions given above must be adhered to, a further necessity in order to produce significant yields of cyclooctadiene is to adjust the reaction conditions with respect to one another in such a way that the total conversion of buadiene in a batch operation or in a single pass of a continuous flow operation is restricted to not more than 35 per cent by weight of the butadiene charged. It is preferred that the total conversion not exceed 20 per cent, but it should be at least 10 per cent. One skilled in the art will understand that to accomplish this the higher pressures and longer contact times within the stated ranges will be used with temperatures within the lower part of the temperature range given. In other words, generally the higher the pressure the lower the temperature and vice versa, the longer the contact time the lower the temperature and vice versa, and the higher the pressure the shorter the contact time and vice versa.

While the reactor may be constructed out of any suitable material, we have found that stainless steel is a particularly desirable material to use. Since the reaction is carried out under superatmospheric pressure, ceramic materials are not particularly valuable except as liners for metal containers. Ordinary low carbon steel, while suitable for lower temperature operation, is not usually employed when operating near the upper limits of our temperature range. Metallurgical and mechanical factors will generally determine the material used in the reactors for our process rather than any chemical factor.

While the process is operated satisfactorily by passing the butadiene through an empty reactor, such as a tube or the like, the reactor, may also be packed with solid contact material such as glass chips, alumina, silica, etc., which may or may not exhibit catalytic activity toward the reaction, and which will assist mixing and heat transfer between the reaction mixture and the walls of the vessel.

The unsubstituted 1,3-butadiene is a preferred reactant, producing unsubstituted 1,5-cyclooctadiene. Other 1,3-butadiene hydrocarbons, by which we mean hydrocarbons having conjugated olefinic bonds present in a chain of at least 4 carbon atoms in length, may also be reacted to give the corresponding hydrocarbon having a cyclooctadiene nucleus. Such hydrocarbons may be represented by the general formula

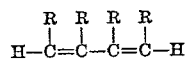

wherein each R represents an alkyl group selected from the class consisting of methyl, ethyl, normal propyl, and isopropyl, wherein the R's may be the same or different, and wherein the total number of carbon atoms in the R's does not exceed 8; any one or more R may also be hydrogen.

Following are some specific examples of the operation of our process to produce 1,5-cyclooctadiene hydrocarbons from 1,3-butadiene hydrocarbons. It is to be understood that they are merely illustrative of our process and that the process is not to be limited in its broadest scope by the exact conditions employed in these examples.

Example I 1,3-butadiene was passed from a storage tank through a flow meter into a stainless steel reaction tube which was heated and maintained at a temperature of 700° F. Butadiene was fed at a rate equivalent to 268 volumes of gas at standard conditions of temperature and pressure per volume of reaction space per hour, which resulted in a contact time of 21 seconds at the operating temperature of 703° F. and pressure of 55 pounds/sq. inch absolute. During the reaction some temperature variation occurred. The average temperature was 703° F. and the maximum reached was 758° F. for a short period. After a period of operation of 15 hours, the flow of butadiene was discontinued and a liquid product which had been condensed at the outlet of the reaction tube by means of a water cooled condenser was segregated and subjected to fractionation. The yield of liquid product collected was equivalent to 27 per cent of the butadiene fed to the reactor. The product when fractionated yielded a portion of 4-vinyl-1-cyclohexene boiling between 255 and 266° F., a fraction boiling from 290 to 310° F. which comprised 1,5-cyclooctadiene, a fraction boiling above 312° F. comprising highly colored trimers and heavier polymers, and an undistillable residue. Of the total liquid polymer collected, the vinyl-cyclohexene and lighter fraction comprised 84.5 per cent, an intermediate boiling fraction 0.8 per cent, the cyclooctadiene fraction 5.1 per cent, and the total heavier material 9.7 per cent. On redistillation essentially all of the cyclooctadiene fraction was recovered as a fraction boiling at 298 to 300° F. The material had a refractive index of 1.4938 at 20° C. and was clear and colorless. It reacted readily with 2 molecules of bromine and was hydrogenated at 40 pounds pressure and atmospheric temperature over a palladium catalyst to form cyclooctane, absorbing in the process 2 molecules of hydrogen. The cyclooctane produced boiled at 297° F., and had a refractive index $n_D^{20}$ of 1.4580. 4-Vinyl-1-cyclohexene and isomeric vinyl cyclohexenes are all readily hydrogenated under similar conditions to ethylcyclohexane, boiling point, 267° F. refractive index $n_D^{20}$ of 1.4332. The cyclooctadiene fraction yielded on ozonization 2 molecules of succinic acid per molecule of cyclooctadiene oxidized. No other oxidation products were produced.

Example II 1,3-butadiene was passed from a charge cylinder through a vaporizing chamber where it was heated and vaporized to a temperature of 250° F., through a preheater tube and finally into a 2½ inch steel pipe which served as reactor tube. The reactor system was maintained at 55 pounds/square inch absolute. The butadiene was flowed through this tube at a space velocity of 230 standard gas vol./vol. of reaction space/hour and the reaction tube was maintained within the temperature range 775–850° F. Under these conditions residence time for butadiene in the reaction zone was approximately 22 seconds. Liquid products were passed through condensing coils and collected in a suitable receiver. Any gaseous reaction passed off through a meter which, however, showed no movement during the operation. The liquid product was subjected to fractionation, in which the unreacted butadiene was distilled off and recycled to the reactor. At the end of an operating period of 8 hours, the heavy liquid products were removed and subjected to fractionation. It was found to constitute 20 per cent of the butadiene fed to the reactor. After segregation of a fraction boiling at 290–310° F., the fraction was redistilled, and cyclooctadiene recovered boiling in the range of 298–310° F. at atmospheric pressure. This material had a refractive index of 1.4938 and was identical with the material recovered in Example I. A yield of 10 per cent of the butadiene converted to polymers was obtained as cyclooctadiene.

Example III

Butadiene was passed through the reactor of Example II at a flow rate of 230 standard vol./vol./hr. at an average temperature of 800–850° F. Contact time at these conditions was 19.2 seconds with the pressure of 47 lbs./sq. in. abs. Conversion of 19 per cent of the butadiene passed through the reactor was obtained. On isolation of the pure fraction boiling at 298–300° F., a yield of 5 per cent of the cyclooctadiene, based on total polymer, was recovered.

Example IV

A series of runs was made in which effects of varying the reaction conditions were determined. The data are presented in the following table.

| Run | Pressure (p.s.i.a.) | Av. Temp. (° F.) | Time (Sec.) | Conv. (Per cent) | Product | | | | |
|---|---|---|---|---|---|---|---|---|---|
| | | | | | Light, (Per cent) | Vinyl Cyclo- hexene (Per cent) | Inter. med. Boiling (Per cent) | Cyclo Octa- diene (Per cent) | Heavy (Per cent) |
| 1 | 15 | 720 | 18 | (1) | | | | | |
| 2 | 15 | 950 | 15 | 48.0 | | 75 | 7 | 0.2 | 17.8 |
| 3 | 15 | 850 | 13 | 19.0 | 2 | 87 | | 0.3 | 11.0 |
| 4 | 15 | 920 | 11 | 31.0 | 7.5 | 82 | 0.7 | 0.8 | 9.0 |
| 5 | 55 | 715 | 19 | 15.5 | | 86 | 4.0 | 6.0 | 4.0 |
| 6 | 55 | 705 | 45 | 33.5 | | 85 | 1.0 | 2.0 | 12.0 |
| 7 | 115 | 675 | 4.8 | 5.5 | 1.8 | 81.8 | 1.8 | 5.6 | 9.1 |

[1] 1 or less.

In runs 1 and 5, the effect of varying the pressure is clearly demonstrated. Runs 2 and 4 show that while high temperatures lead to high conversions, the product is shifted to predominantly heavy polymer. In run 6 long contact time is shown to affect the conversion and shift of product to high polymers in a manner similar to that evident with high temperature. In an eighth run in which the pressure was 55 pounds per square inch absolute, the temperature became uncontrolled and rose to more than 900° F. In this run the product was principally heavy polymer, with large amounts of naphthalene.

While 1,3-butadiene has been disclosed above as the preferred reactant, any of the general class as herein defined may be employed. As further examples of suitable reactants may be mentioned isoprene, piperylene, 2,2-dimethyl-1,3-butadiene, etc. Among the many modifications which may be made in the specific operations hereinabove discussed, there may be mentioned the use of inert diluents in the reaction mixture. In order to obtain controlled reaction time, the reactor effluent is cooled rapidly, either by indirect heat exchange or by introduction of water or other quench fluid. Inasmuch as the extent of reaction is deliberately limited, a major proportion of the hydrocarbon content of the reactor effluent is unreacted butadiene, which is recovered and recycled. Furthermore, by recovering the vinylcyclohexene formed and de-dimerizing it to butadiene by methods well known in the art, additional quantities of monomer are made available for the feed and ultimate yields of cyclooctadiene are greatly increased.

We claim:

1. A process for the production of 1,5-cyclooctadiene which comprises passing 1,3-butadiene in vapor phase through an empty tube in the absence of a polymerization inhibitor and in the absence of a catalyst at a combination of reaction conditions within the ranges of 600 to 1100° F., 20 to 250 pounds per square inch absolute, and 1 to 50 seconds such as to convert not in excess of 35 per cent of said butadiene to materials other than butadiene, and recovering 1,5-cyclooctadiene from conversion products lower boiling and higher boiling than said 1,5-cyclooctadiene.

2. A process for the production of cyclooctadiene hydrocarbons which comprises subjecting a 1,3-butadiene hydrocarbon containing from 4 to 12 carbon atoms and containing not over 3 carbon atoms in any alkyl group attached to the 1,3-butadiene residue in vapor phase in the absence of a polymerization inhibitor and in the absence of a catalyst to a combination of reaction conditions within the ranges of 600 to 1100° F., 20 to 250 pounds per square inch absolute, and 1 to 50 seconds such as to convert not in excess of 35 per cent of said butadiene hydrocarbon to materials other than said butadiene hydrocarbon, and recovering cyclooctadiene hydrocarbons from conversion products lower boiling and higher boiling than said cyclooctadiene hydrocarbons.

3. A process for the production of 1,5-cyclooctadiene which comprises subjecting 1,3-butadiene in vapor phase in the absence of a polymerization inhibitor and in the absence of a catalyst to a combination of reaction conditions within the ranges of 650 to 900° F., 35 to 120 pounds per square inch absolute, and 2 to 20 seconds such as to convert from 10 to 20 per cent of said butadiene to materials other than butadiene, separating liquid products from unreacted butadiene, subjecting said liquid products to fractional distillation, and recovering by fractional distillation a 1,5-cyclooctadiene fraction boiling wholly within the range of 290 to 310° F.

4. A process for the production of cyclooctadiene hydrocarbons which comprises subjecting a 1,3-butadiene hydrocarbon containing from 4 to 12 carbon atoms and containing not over 3 carbon atoms in any alkyl group attached to the 1,3-butadiene residue in vapor phase in the absence of a polymerization inhibitor and in the absence of a catalyst to a combination of reaction conditions within the ranges of 650 to 900° F., 35 to 120 pounds per square inch absolute, and 2 to 20 seconds such as to convert from 10 to 20 per cent of said butadiene hydrocarbon to materials other than said butadiene hydrocarbon, separating liquid products from unreacted butadiene hydrocarbon, subjecting said liquid products to fractional distillation, recovering by fractional distillation a fraction containing all of the vinylcyclohexene dimer derivative of said butadiene hydrocarbon, subjecting said fraction to de-dimerization to convert same to butadiene hydrocarbon, returning the latter to the reaction for further conversion, also recovering from said liquid products by fractional distillation a fraction consisting essentially of cyclooctadiene hydrocarbons as product of the process, and further recovering by fractional distillation at least one fraction comprising polymers higher boiling than said cyclooctadiene hydrocarbons.

5. A process for the production of cyclooctadiene which comprises subjecting 1,3-butadiene in vapor phase in the absence of a polymerization inhibitor and in the absence of a catalyst to a combination of reaction conditions within the ranges of 600 to 1100° F., 20 to 250 pounds per square inch absolute, and 1 to 50 seconds such as to convert not in excess of 35 per cent of said butadiene to materials other than butadiene, recovering unreacted butadiene from the reaction mixture and returning same to the reaction, and fractionally distilling the remainder of the reaction mixture to segregate a cyclooctadiene fraction from lower boiling vinylcyclohexene and higher boiling polymers.

6. A continuous process for converting 1,3-butadiene to cyclooctadiene which comprises flowing a continuous stream of said butadiene in vapor phase through a tubular reactor in the absence of a polymerization inhibitor and in the absence of a catalyst at pressures within the range of 35 to 120 pounds per square inch absolute and temperatures within the range of 650 to 900° F., the higher pressures being employed with the lower temperatures, and for a reaction time in the range of 2 to 20 seconds so chosen as to permit conversion of from 10 to 20 per cent of the butadiene to materials other than butadiene, and recovering cyclooctadiene from conversion products lower boiling and higher boiling than said cyclooctadiene.

7. The process of claim 6 wherein vinylcyclohexene is recovered from the reaction products and is de-dimerized to form 1,3-butadiene, and the latter is returned to the reactor as part of the stream of butadiene passed therethrough.

JOHN C. HILLYER.
JAMES V. SMITH.

REFERENCES CITED

The following references are of record in the file of this patent:

UNITED STATES PATENTS

| Number | Name | Date |
|---|---|---|
| 2,401,414 | Doumani et al. | June 4, 1946 |
| 2,468,432 | Johnson | Apr. 26, 1949 |
| 2,504,016 | Foster | Apr. 11, 1950 |

FOREIGN PATENTS

| Number | Country | Date |
|---|---|---|
| 343,116 | Great Britain | Feb. 16, 1931 |

OTHER REFERENCES

Carothers et al., "Jour. Am. Chem. Soc.," vol. 53, p. 2411 (1931).
Carothers et al., "Ibid," vol. 55, page 791 (1933).
Brown et al., "J. Chem. Soc." (London), pp. 101-3 (1944).